United States Patent [19]

Gargano

[11] Patent Number: 4,684,082
[45] Date of Patent: Aug. 4, 1987

[54] PARACHUTE SUSPENSION LINE ATTACHMENT STRUCTURE

[76] Inventor: William L. B. Gargano, 1516 Drexel Dr., Davis, Calif. 95616

[21] Appl. No.: 759,455

[22] Filed: Jul. 26, 1985

[51] Int. Cl.⁴ .............................................. B64D 17/02
[52] U.S. Cl. ...................................... 244/142; 244/145
[58] Field of Search ...... 244/145, 142, 149, DIG. 1.2, 244/DIG. 1.1

[56] References Cited

U.S. PATENT DOCUMENTS

| 2,365,184 | 12/1944 | Frieder et al. | 244/145 |
|---|---|---|---|
| 2,426,926 | 9/1947 | Frieder et al. | 244/145 |
| 3,724,789 | 4/1973 | Snyder | 244/145 |
| 4,399,969 | 8/1983 | Gargano | 244/145 |

FOREIGN PATENT DOCUMENTS 206084  3/1955  Australia ............................ 244/145

Primary Examiner—Joseph F. Peters, Jr.
Assistant Examiner—Lynn M. Fiorito
Attorney, Agent, or Firm—Baker, Maxham & Jester

[57] ABSTRACT

Each suspension line of a multi-cell gliding parachute is connected through a lower loop of a primary reinforcing tape folded over on itself. The upper overlying segments of the primary reinforcing tape extend partially across and are stitched to one side of a corresponding fabric rib connected between upper and lower fabric canopies of the parachute. The upper ends of the segments terminate below the upper canopy and are connected to a secondary reinforcing tape also stitched to the rib and spaced from the upper canopy. The upper segments of the primary reinforcing tape and the secondary reinforcing tape form a Y, T or other configuration serving to distribute the load from the suspension line without puckering or otherwise altering the preferred airfoil configuration of the upper and lower canopies.

9 Claims, 5 Drawing Figures

PARACHUTE SUSPENSION LINE ATTACHMENT STRUCTURE

BACKGROUND OF THE INVENTION

The present invention relates to parachutes, and more particularly, to a gliding parachute of the flexible airfoil type having an improved suspension line attachment structure which provides better stress distribution while reducing weight and bulk.

For many years parachutes have been constructed by sewing a plurality of panels together to define a hemispherical structure when inflated. Some of these dome-like parachutes have incorporated slits, vents or baffles for controlling the flow of air therethrough, both to facilitate deployment and to provide maneuverability. However, these parachutes are adapted primarily for nearly vertical descent, and generally do not permit a load to be guided over substantial horizontal distances to a target landing area.

Recently, gliding parachutes have been developed for sport jumping, fire fighting, and military applications which can be readily manipulated to carry a load over a substantial distance. A typical gliding parachute is preformed and constrained in such a manner that when inflated it will define an airfoil in longitudinal section. When a load is suspended from this type of inflated parachute, the parachute will glide forwardly and its airfoil shape will provide the necessary lift. By controlling the peripheral edges of the gliding parachute, the parachute and the load can be guided in their path of descent to a target many miles away from the drop point.

Much emphasis has been placed on the fabric and rigging configurations of previous gliding parachutes in an effort to approximate, as close as possible, a conventional airfoil shape. This results in maximum lift for a given chute area which in turn provides the maximum glide ratio.

In a multi-cell gliding parachute upper and lower fabric canopies are connected by laterally spaced fabric ribs. Suspension lines are connected at their upper ends to the parachute and converge downwardly to a harness or other load supporting structure. The fabric sections of the parachute are normally made of a high strength, lightweight fabric of suitable porosity, such as that sold under the trademark F-111 RIPSTOP NYLON. These sections are typically connected by stitching their adjoining edges together with strong thread.

The manner in which the suspension lines are attached to a multi-cell gliding parachute is very important because it is the means by which the load is supported. The attachment structure must be strong enough to withstand the forces encountered during deployment without ripping the fabric or disconnecting a suspension line. Also, the attachment structure must be designed to constrain the canopies in such a manner as to produce the desired airfoil shape. However the suspension line attachment structure must not add an undue amount of weight or bulk to the parachute since it must be tightly packed in a small enclosure and carried by the jumper prior to deployment.

Heretofore different approaches have been used in attaching the suspension lines to the parachute. U.S. Pat. No. Re. 26,427 of Jalbert discloses a gliding parachute including an upper canopy and a bottom planar skin connected together by a plurality of vertically extending, spaced apart ribs to define longitudinal channels through which air flows to sustain a conventional airfoil shape. Connected to the bottom skin of the parachute are a plurality of fabric wedges which provide for even distribution of the forces of the suspension lines to the bottom skin to permit it to retain a flat configuration during flight.

U.S. Pat. No. 3,724,789 of Snyder discloses a gliding parachute of the multi-channel type in which the suspension lines are secured to the airfoil-shaped ribs between the upper and lower panels of the wing with a plurality of reinforcing tapes to distribute the load. In the Snyder parachute the reinforcing tapes are stitched to the fabric ribs. These tapes extend across the full height of the ribs and are connected directly to spaced locations on the upper canopy. A plurality of such tapes is used to connect each suspension line to a corresponding rib. The tapes associated with each suspension line extend across the corresponding rib in diverging fashion from their point of connection with the tape.

U.S. Pat. No. 4,399,969 of Gargano discloses another multi-cell gliding parachute in which the suspension lines are connected to the ribs by single reinforcing tapes which are stitched to the ribs and extend the full height thereof.

U.S. Pat. No. 2,365,184 of Frieder et al. discloses a special hem construction for lessening the likelihood that stitching will rupture from loads applied through the shroud lines. Only a section of the parachute is illustrated, however, it is assumed that it is of the single canopy, hemispherical type widely used during World War II in view of the filing date of the patent. The peripheral edge of the canopy is folded around a reinforcing cord and stitched. At each side of each point where a shroud line is connected are two tapes stitched to the canopy, the tapes of each pair crossing under the hem adjacent to the opening through the hem through which the reinforcing cord is exposed. FIG. 4 of Frieder et al illustrates a single tape version of the special hem construction.

Whatever the form of the fabric portion and rigging previously employed in a gliding parachute, there has been a tendency for the shape of the inflated wing to depart from the desired conventional airfoil shape. The various fabric and rigging constructions which have heretofore been utilized in gliding parachutes in an attempt to maintain the conventional airfoil shape have added to the weight and complexity of the parachute.

For example, the fabric wedges or flares of the Jalbert parachute described above provide a good deal of load distribution that lessens the chance of rupturing stitching or disconnection of a suspension line. These flares also aid in distributing the load over the canopies in a manner that preserves their desired airfoil shape. However these flares add considerable weight and bulk to the parachute.

The suspension line attachment structure of Snyder results in bumps or puckers in the upper canopy. This lessens the efficiency of the inflated airfoil resulting in increased drag and less lift. The use of multiple reinforcing tapes for each suspension line also adds to the bulk and weight of the parachute.

SUMMARY OF THE INVENTION

It is therefore the primary object of the present invention to provide an improved suspension line attachment structure for a parachute.

It is another object of the present invention to provide an improved suspension line attachment structure for a gliding parachute.

It is another object of the present invention to provide an improved suspension line attachment structure for a gliding parachute that will distribute the load so as to maintain the desired airfoil shape.

It is another object of the present invention to provide an improved suspension line attachment structure for a gliding parachute which adds minimum bulk and weight to the parachute.

Still another object of the present invention is to provide an improved suspension line attachment structure for a gliding parachute which distributes the load so as to maintain an optimum airfoil shape without adding undue weight and bulk.

Yet another object of the present invention is to provide an improved parachute suspension line attachment structure of the aforementioned type which is inexpensive and readily constructed.

Still another object of the present invention is to provide an improved parachute suspension line attachment structure of the aforementioned type which can withstand the loads encountered during deployment and descent without rupturing of the stitching or fabric.

In the illustrated embodiment of the present invention each suspension line of a multi-cell gliding parachute is connected through a lower loop of a primary reinforcing tape folded over on itself. The upper overlying segments of the primary reinforcing tape extend partially across and are stitched to one side of a corresponding fabric rib connected between upper and lower fabric canopies of the parachute. The upper ends of the segments terminate below the upper canopy and are connected to a secondary reinforcing tape also stitched to the rib and spaced from the upper canopy. The upper segments of the primary reinforcing tape and the secondary reinforcing tape form a Y, T or other configuration serving to distribute the load from the suspension line without puckering or otherwise altering the preferred airfoil configuration of the upper and lower canopies.

DESCRIPTION OF THE PREFERRED EMBODIMENTS

Figure 1:
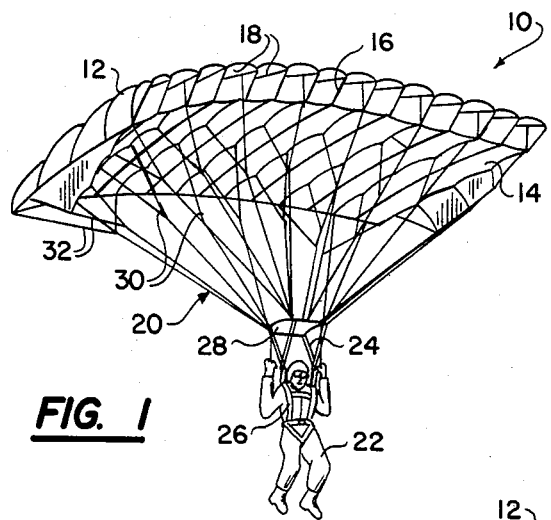
FIG. 1 is a perspective view of a multi-cell gliding parachute in flight.

Referring to FIG. 1, my invention is primarily adapted for use in a multi-cell gliding parachute 10. Such a parachute includes upper and lower aligned, rectangular fabric canopies 12 and 14. The canopies are connected to one another by a plurality of vertically extending airfoil-shaped fabric ribs 16. The ribs extend longitudinally across the canopies at laterally spaced locations to define a plurality of cells 18. The upper canopy 12 is connected to the upper edge of each of the ribs 16. Similarly the lower canopy 14 is connected to the lower edge of each of the ribs. As the wing glides forwardly, air flows through each of the cells 18 to sustain the airfoil cross-section of the parachute.

A plurality of suspension lines 20 (FIG. 1) are connected to the parachute or fabric wing 10 and converge downwardly to support a load in the form of a jumper 22. The lower portions of the suspension lines include four risers 24. The upper rope portions of of the suspension lines are attached to the upper ends of the risers 24 by connector links (not illustrated). The lower ends of the risers 24 are in turn secured to harness 26 worn by the jumper 22. Four separate groups of the suspension lines are threaded through corresponding corners of a square slider 28. During deployment of the parachute, the slider 28 moves downwardly over the suspension lines until it reaches the position illustrated in FIG. 1, directly over the jumper's head. The slider thus controls inflation of the parachute and prevents dangerous explosive openings thereof.

The upper portions of the suspension lines include pairs of cascade lines 30 (FIG. 1) whose upper ends are connected to the ribs 16 through the lower canopy 14 as hereafter described in greater detail. A plurality of control lines 32 may be manually operated by the jumper 22 by pulling on toggles (not visible in FIG. 1) to deform the trailing edges of the parachute to permit steering and modification of the angle of attack of the parachute. The various lines may be made of suitable lightweight, strong rope, such as 450–700 pound test line made of material sold under the trademarks DACRON or KEVLAR.

Further details of the general construction of the gliding parachute 10 may be found in U.S. Pat. No. 4,399,969 of Gargano, the entire disclosure of which is incorporated herein by reference.

Figure 2:
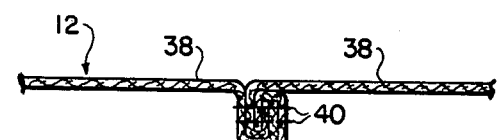
FIG. 2 is an enlarged, partially exploded cross-sectional view of a portion of the gliding parachute of FIG. 1 illustrating a preferred embodiment of my suspension line attachment structure.
Figure 2:
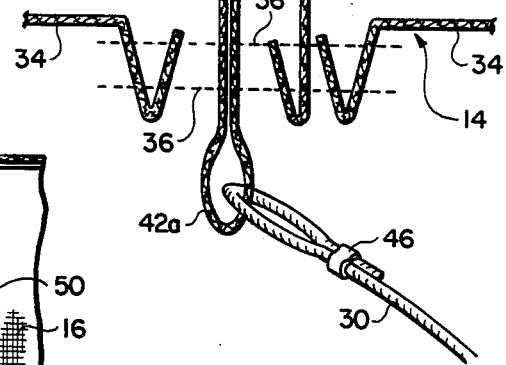

Details of my suspension line attachment structure are illustrated in FIG. 2. The lower canopy 14 of the gliding parachute 10 is comprised of a plurality of rectangular fabric panels 34. The opposing longitudinal edges of adjacent ones of the panels 34 are folded over and attached along the entire bottom folded over portion of a corresponding rib 16 by stitching 36. Similarly the upper canopy 12 is comprised of a plurality of rectangular fabric panels 38. The opposing longitudinal edges of adjacent ones of the panels 38 are overlapped with the entire upper edge of the corresponding rib and the three fabric layers are rolled together and secured by stitching 40 along the entire length of the rib.

Continuing with FIG. 2, each suspension line 30 is attached to a rib by a corresponding primary reinforcing tape 42. This tape is folded over itself to form a lower loop 42a. The upper overlying segments 42b of the primary reinforcing tape extend vertically across a portion of the rib 16. The upper ends of the segments 42b terminate below the upper canopy 12. The primary reinforcing tape extends between the folder over edge of one of the lower fabric panels 34 and the folded over lower edge of the rib 16. The tape 42 is held in place by the stitching 36. The segments 42b of the primary reinforcing tape are also secured to the rib 16 by stitching 44 (FIG. 3) along the entire lengths of the side edges thereof.

The upper end of the suspension line 30 (FIG. 2) passes through the loop portion 42a of the primary reinforcing tape and is secured to itself by a clamp 46. The upper ends of the segments 42b of the primary reinforcing tape terminate below the upper canopy 12 and are stitched to a secondary reinforcing tape 47

Figure 3:
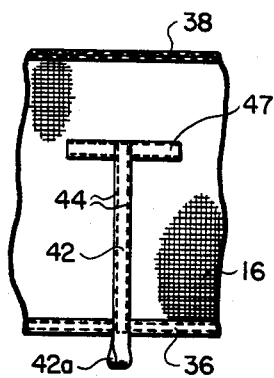
FIGS. 3, 4 and 5 are enlarged fragmentary side elevation views of a portion of a rib of the gliding parachute of FIG. 1 illustrating alternate configurations for the load distributing portion of my suspension line attachment structure.

(FIG. 3). This tape 47 is also stitched to the same side of the corresponding rib 16 and is spaced from the upper canopy 12. The secondary tape 47 extends horizontally along the rib 16. The primary and secondary reinforcing tapes 42 and 47 form a T-shaped configuration. This configuration serves to distribute the load from the suspension line 30 across the rib. The rib in turn serves to spread the load or stress across it upper edge to a large area of the upper canopy 12, thereby eliminating any tendency of the canopy to pucker in the region adjacent the suspension line attachment point. This in turn insures that the inflated canopy will adhere to a true airfoil shape, thus maximizing lift and minimizing drag. The illustrated suspension line attachment structure has a minimum of weight and bulk compared to the fabric wedges of the aforementioned Jalbert patent.

Figure 4:
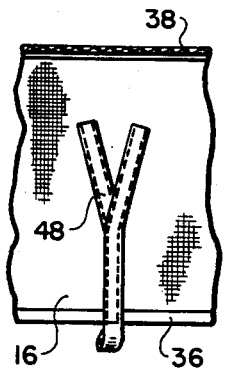
Figure 5:
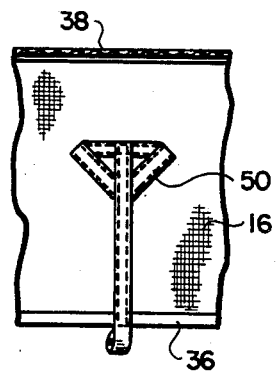

FIG. 4 illustrates an alternate embodiment of my invention in which the upper portion of the primary reinforcing tape and the secondary reinforcing tape form a Y-shaped load distributing configuration 48. FIG. 5 illustrates another alternate embodiment in which the secondary reinforcing tape is folded and stitched to the rib and to the upper end of the primary tape in the form of an inverted triangle 50.

Having described preferred embodiments of my improved parachute suspension line attachment structure, it should be apparent to those skilled in the art that my invention may be modified in both arrangement and detail. Therefore the protection afforded my invention should only be limited in accordance with the scope of the following claims.

I claim:

1. In combination with an inflatable parachute having upper and lower fabric canopies connected by a plurality of airfoil-shaped fabric ribs and a plurality of suspension lines, a structure for attaching each of the suspension lines to a corresponding one of the ribs, comprising:

a primary reinforcing tape;

means for securing the primary reinforcing tape in overlapping relationship with a corresponding rib; the primary reinforcing tape extending vertically across the rib and having an upper end which terminates below the upper canopy;

means for attaching a suspension line to a lower end of the primary reinforcing tape;

a secondary reinforcing tape connected to the upper end of the primary reinforcing tape, the secondary reinforcing tape having an upper end which terminates below and is spaced from the upper canopy; and means for securing the secondary reinforcing tape in overlapping relationship with the rib below the upper canopy and spaced therefrom for distributing a load on the suspension line across the rib to thereby inhibit the formation of puckers in the upper canopy when inflated.

2. The combination of claim 1 wherein the primary reinforcing tape and the secondary reinforcing tape are arranged and connected in a T-shaped configuration.

3. The combination of claim 1 wherein the primary reinforcing tape and the secondary reinforcing tape are arranged and connected in a Y-shaped configuration.

4. The combination of claim 1, wherein the secondary reinforcing tape is configured in the shape of an inverted triangle.

5. The combination of claim 1 wherein the means for securing the primary reinforcing tape comprises stitching.

6. The combination of claim 1 wherein the means for securing the secondary reinforcing tape comprises stitching.

7. The combination of claim 1 wherein the primary reinforcing tape is folded over on itself to form a lower loop portion.

8. The combination of claim 7 wheren the means for attaching the suspension line includes a loop portion of the suspension line which passes through the lower loop portion of the primary reinforcing tape.

9. The combination of claim 1 wherein the primary reinforcing tape extends between a folded over edge of a panel portion of the lower canopy and a folded over lower edge of the rib, and stitching connects the folded over edges of the panel and rib with the primary reinforcing tape.

* * * * *